United States Patent [19]

Gorgens et al.

[11] 4,214,486
[45] Jul. 29, 1980

[54] SEALED CASING FOR PRESSURE GAUGE

[75] Inventors: Joseph E. Gorgens, Trumbull; Frederick M. Kipp, Fairfield; Robert D. Bissell, Orange, all of Conn.

[73] Assignee: Dresser Industries, Inc., Dallas, Tex.

[21] Appl. No.: 946,895

[22] Filed: Sep. 28, 1978

Related U.S. Application Data

[63] Continuation of Ser. No. 767,093, Feb. 9, 1977, abandoned.

[51] Int. Cl.² .................... G01D 11/26; G01L 7/04
[52] U.S. Cl. ......................................... 73/738; 73/431
[58] Field of Search ............... 73/431, 715, 416, 732, 73/738, 739, 708, 300; 239/390, 391; 220/82 A, 4 B, 4 E; 138/96 R; 58/90 R; 92/130 F

[56] References Cited

U.S. PATENT DOCUMENTS

| | | | |
|---|---|---|---|
| 1,435,922 | 11/1922 | Hasse | 73/738 |
| 1,461,200 | 7/1923 | Strandell | 73/738 |
| 2,615,471 | 10/1952 | McFarland, Jr. | 92/103 F X |
| 2,752,787 | 7/1956 | Jankura | 73/738 |
| 2,762,396 | 9/1956 | Fawick | 92/103 F X |
| 2,803,138 | 8/1957 | Strobl | 73/416 X |
| 3,006,139 | 10/1961 | Hug et al. | 58/90 R |
| 3,065,767 | 11/1962 | Topf | 138/96 R |
| 3,201,992 | 8/1965 | Hoff, Jr. | 73/416 |
| 3,238,574 | 3/1966 | Martin et al. | 220/82 A X |
| 3,337,077 | 8/1967 | Wheaton, Jr. | 220/4 B |
| 3,555,812 | 1/1971 | Piquerez | 58/90 R |
| 3,606,352 | 9/1971 | Lutz | 277/153 X |
| 3,622,038 | 11/1971 | Wilhelm | 73/431 X |
| 3,701,284 | 10/1972 | De Meyer | 73/416 |
| 3,710,625 | 1/1973 | Borom et al. | 73/300 X |
| 3,869,916 | 3/1975 | Ojima | 73/431 |
| 3,889,840 | 6/1975 | Price | 220/82 A |
| 3,929,020 | 12/1975 | Honkanen | 73/416 |
| 3,938,393 | 2/1976 | Mogensen et al. | 73/738 |
| 3,966,082 | 6/1976 | Hopkins | 220/319 |
| 3,972,239 | 8/1976 | Puster et al. | 73/431 |
| 4,006,639 | 2/1977 | Wetterhorn | 73/708 |
| 4,051,730 | 10/1977 | Andrews et al. | 73/738 |
| 4,052,899 | 10/1977 | Longhetto | 73/431 X |

FOREIGN PATENT DOCUMENTS 20175 of 1910 United Kingdom ............... 239/390

Primary Examiner—Daniel M. Yasich
Attorney, Agent, or Firm—Daniel Rubin

[57] ABSTRACT

An improved solid front casing for a pressure gauge that is readily field converted from a dust-tight to either a hermetically sealed air-tight or hermetically sealed liquid-tight construction. A flexible closure element is axially supported over a rear opening in the case by a threaded connection with threads formed in the case peripherally surrounding the opening. For either hermetically sealed air-tight or liquid-tight service a self-threaded closure element is replaced by a flexible diaphragm of controlled spring rate axially clamped by a threaded backup ring. Temperature induced volumetric changes imposed on the liquid fill or air fill are compensated for by the spring rate of the diaphragm. In the event of an overpressure occurring internally of the casing the diaphragm can escape from its clamping relation for affording pressure relief. An annular groove formed peripherally about the Bourdon tube socket where extending through the stem aperture of the casing cooperates with the surrounding casing wall to receive an externally applied O-ring for field forming a liquid-tight joint thereat.

16 Claims, 8 Drawing Figures

SEALED CASING FOR PRESSURE GAUGE

This is a continuation of application Ser. No. 767,093, filed Feb. 9, 1977, now abandoned.

CROSS REFERENCE TO RELATED APPLICATIONS

Application Ser. No. 617,356, filed Sept. 29, 1975 entitled "Temperature Compensation for Liquid Filled Pressure Gauge" in the name of R. H. Wetterhorn and now U.S. Pat. No. 4,006,639.

1. The field of art to which the invention pertains includes the art of measuring and testing as directed to fluid pressure gauges having fluid pulsation dampening.

2. Gauge instruments and particularly pressure gauges or the like containing an oil fill have been widely used and are commercially available from a variety of manufacturing sources. Specific reasons vary for selecting or requiring an oil filled gauge versus a dry or unfilled gauge but generally are attributed to either protecting the working mechanism against corrosion and/or system vibration or pulsation to which the instrument is subjected. Prior art exemplifying gauges of this sort are disclosed in U.S. Pat. Nos. 2,773,388; 3,080,758; 3,370,470; 3,712,138; 3,874,241; 3,938,393; 3,990,306; and 3,701,284.

Typically, such prior art constructions have been manufactured solely for either dry or liquid fill but not both and have not been readily field convertible from dry to the liquid fill construction because of the usually higher cost features associated with gauge casings of the latter type. Complicating the dry constructions is the occasional need for a hermetical seal for protection against a corrosive environment without the necessity of a fluid fill. Adding to the cost of constructions for liquid fill are, of course, the obvious added requirements for a leak-tight enclosure while incorporating a breathing capability to the casing. That is, in order to accommodate volumetric changes of a liquid fill from excursions of temperature and/or barometric pressure in the casing environment, a form of breathing vent aperture or other compensation is required to avoid adversely affecting accuracy of the instrument. Moreover, constructions of solid front casings are largely governed by the American National Standard Institute (ANSI) Standard B40.1-1974, Section 3.1.1.2 requiring that the back construction of a solid front gauge be capable of relieving case pressure buildup from within.

Meeting market requirements for such casings in accordance with the prior art has generally been by means of casings designed solely for either form of dry-tight or liquid-tight service without conversion from one to the other. It should be readily apparent that with this approach an ordinary dry dust-tight construction is unsuitable for hermetically sealed service and either dry construction is unsuitable for liquid service. At the same time liquid-tight constructions are too expensive for either form of dry service resulting in significantly greater customer and/or manufacturing inventory to satisfy the respective demands. Despite the foregoing, it has not heretofore been known how to economically fabricate such a casing that is readily and economically field convertible from one to the other while meeting code requirements and maintaining the respective virtues of the sole purpose constructions of the prior art.

SUMMARY OF THE INVENTION

The invention relates to gauge instruments and more specifically to casing constructions for a pressure gauge preferably of the solid front type which are field convertible from dust-tight to a either liquid-tight or a hermetically sealed air or gas filled construction. This is achieved in accordance herewith by means of a solid front gauge casing having a peripherally threaded rear opening. A closure plate overlying the opening is supported in position via the threads thereat and varies in form with the service intended. For dust-tight construction, a thin metal or plastic plate is utilized. In converting for liquid-tight construction the metal plate is replaced with an elastomeric diaphragm of controlled spring rate properties. The diaphragm is axially supported by a threaded backup ring from which it can escape to afford pressure relief in the event of an overpressure within the case. Along with the latter an O-ring seal is applied by external access between the gauge socket and casing socket aperture for effecting a liquid-tight seal therebetween. For hermetically sealed air filled construction, the liquid-tight construction is utilized absent the liquid fill. Since the same basic gauge casing is usable for either the dry or liquid-tight configuration requiring only a minimum substitution of minor components for changing from one to the other, ready field conversion is conveniently possible without need for readjustment, disassembly or reassembly of the working mechanism. By means thereby, the disadvantages of the separate gauges utilized for those purposes in the manner of the prior art are significantly overcome.

It is therefore an object of the invention to provide a novel case construction for a pressure gauge.

It is a further object of the invention to provide a novel case construction for a pressure gauge readily field convertible from a dry to a hermetically seal construction suitable for liquid fill or gas filled service.

It is a further object of the invention to effect the previous object for a solid front case construction while adhering to code requirements therefor.

It is a still further object of the invention to effect the foregoing objects with only minor field changes to the case construction as to effect conversion with a maximum economy of parts and labor rendering such conversion economically feasible as compared to the separate purpose constructions of the prior art.

Figure 1:
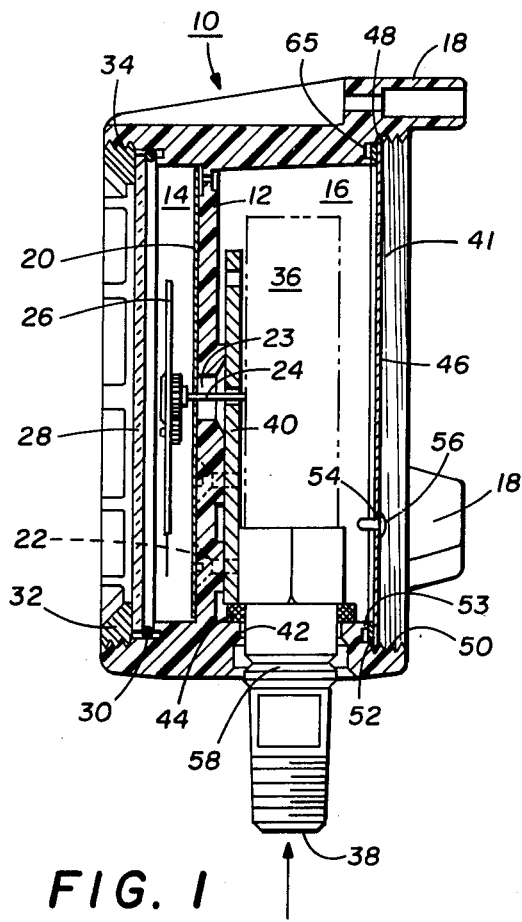
FIG. 1 is a sectional elevation of a gauge casing as adapted for dry or dust-tight service.

Referring now to the drawings, there is illustrated in FIG. 1 a more or less typical turret-shaped gauge casing 10 formed of phenolic or polypropylene or other commercially suitable plastic composition. The casing is of a solid front construction in which an intermediate wall 12 separates a front compartment 14 from a rear compartment 16. A plurality of bolt bosses 18 spaced around the rear periphery enable convenient mounting of the gauge in a variety of manners which are per se well known.

Contained within front compartment 14 is a dial plate 20 secured via screws 22 to the front face of wall 12. Centrally extending through a wall aperture 23 is a pointer shaft 24 supporting a pointer 26 for displacement relative to graduated pressure values contained on the dial plate. Enclosing the front compartment is a window 28 clamped pressure tight against an O-ring seal 30 by means of a threaded bezel ring 32 received within internal casing threads 34 thereat. Rear compartment 16 contains a pressure responsive element such as a Bourdon tube 36 having an inlet socket 38 for receipt of the supplied fluid for which pressure measurements are to be obtained. Socket 38 is secured as by welding to a mounting plate 40 in turn attached to wall 12 by screws 22. Via a gear movement (not shown) pointer shaft 24 is driven in response to tip travel of tube 36 in a conventional manner. At the extreme back of case 10 is defined an internal opening 41 generally surrounded by threads 50 which with the contiguously inward casing formation provides a mounting structure for mounting the received closure plates hereof.

Figure 2:
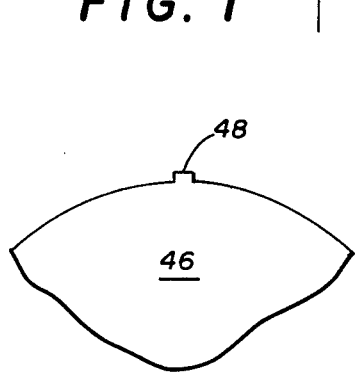
FIG. 2 is a fragmentary front view of the cover plate utilized in FIG. 1.

For the dustproof construction embodiment of FIG. 1, casing aperture 42 surrounding Bourdon tube socket stem 38 is sealed off against dust entry by a compressed sponge gasket 44. Closing off opening 41 is a removable thin closure plate 46 of metal or plastic composition. The plate can be screw fastened or have a plurality of radial tabs 48 (FIG. 2) spaced around its periphery for threading engagement with casing threads 50. An annular gasket 52 supported between the closure plate and a casing shoulder 53 thereat serves to afford dust-tight sealing. Aperture 54 located off center in plate 46 is normally fitted with a removable coverplug 56 which when removed enables gripping the plate via a suitable tool for threading and unthreading of plate 46 into and out of the shown placement position.

Field conversion from a dust-tight to a hermetically sealed air filled or light-tight construction will now be described with specific reference to FIG. 3. As compared to that of FIG. 1, conversion for either of these purposes first requires an increased socket seal about the inlet stem 38 of Bourdon tube 36. This is effected in accordance herewith by a groove 58 preformed in the stem so as to be located when assembled in place within the confines of casing aperture 42 yet having exterior accessibility. By inserting an O-ring gasket 60 inwardly from the end of stem 38 into groove 58, a tight fitting sealing relation is readily effected therebetween.

Figure 8:
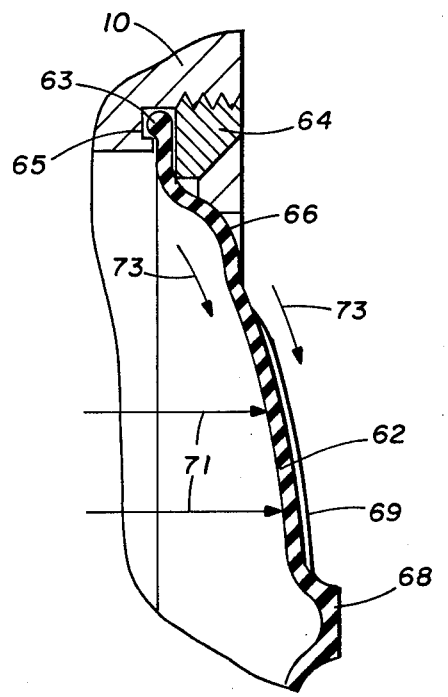
FIG. 8 is a fragmentary enlarged section of a pressure expanded diaphragm.

With gasket 60 in place, rear closure plate 46 is removed by threading outward of threads 50. On removing gasket 52, a fluid fill is added for the liquid filled version after which a flexible diaphragm 62 is axially clamped semi-secured inot position by an annular threaded ring 64. For this purpose, diaphragm 62 includes a beaded periphery 63 semi-loosely received within an annular case groove 65. Diaphragm 62 is of a molded plastic elastomeric composition such as ethylene propylene preferably having a spring rate of about 0.16 to 0.25 p.s.i. case pressure change per cubic inch of case fill fluid or air fill volume change contemplated. This relationship is generally matched to the thermal expansion coefficient of the fluid fill to be employed for avoiding error in the instrument readout which could otherwise occur. For a more complete understanding of the matching relationship, see the Wetterhorn application supra.

Where required for deflection strength, diaphragm 62 includes an annular boss 66 on its backside and a center boss 68 joined by a plurality of radial ribs 69. In this manner, outward bulging of the diaphragm is controlled to the position shown dashed in response to temperature and/or pressure induced expansion incurred by the fluid fill contained within the casing. Fluid fill may, for example, comprise silicone oil having an expansion coefficient of about 0.00106 cc/cc per degree centigrade. At such increasing pressure on the order of 9 to 14 p.s.i.g. as could result from an internal leak of Bourdon tube 36, diaphragm 62 being only semi-secured by ring 64 will dislodge at its periphery from beneath the ring for relieving overpressure from the casing in the manner of FIG. 8. As there shown, arrows 71 represent the acting blowout force and arrows 73 represent the pullout force being imposed on diaphragm 62.

Figure 3:
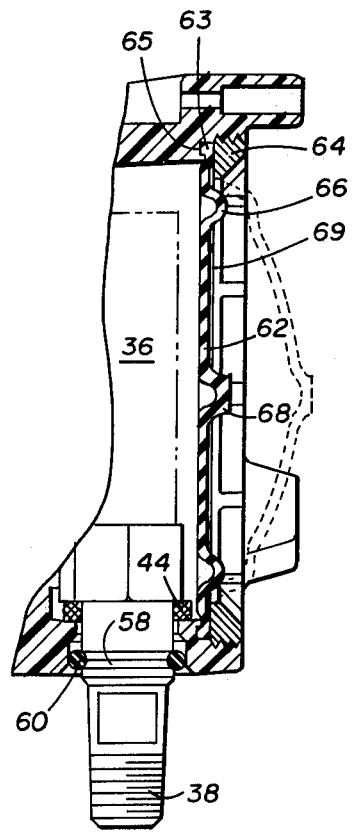
FIG. 3 is a partial sectional elevation of the casing of FIG. 1 modified for either hermetically sealed air fill or liquid fill service in accordance with a first embodiment hereof.
Figure 4:
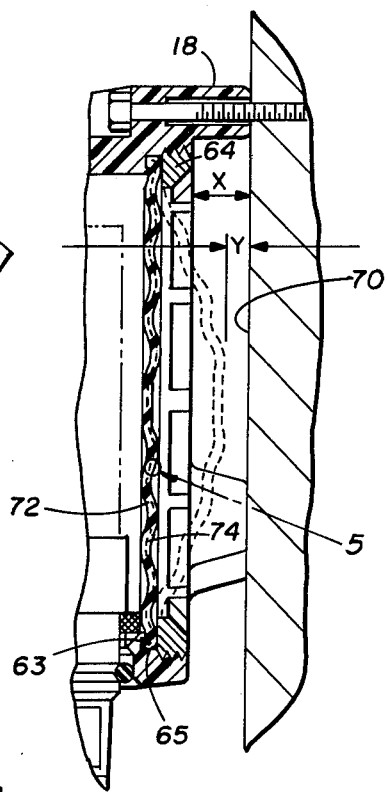
FIG. 4 is a partial sectional elevation of the casing of FIG. 1 modified for either hermetically sealed air fill or liquid fill service in accordance with a second embodiment hereof.
Figure 5:
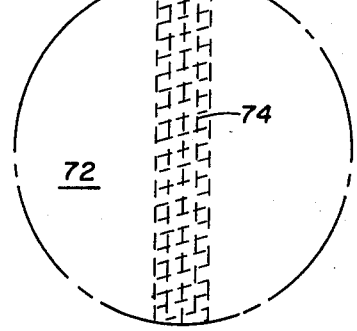
FIG. 5 is a magnified view of the encircled portion 5 of FIG. 4.
Figure 6:
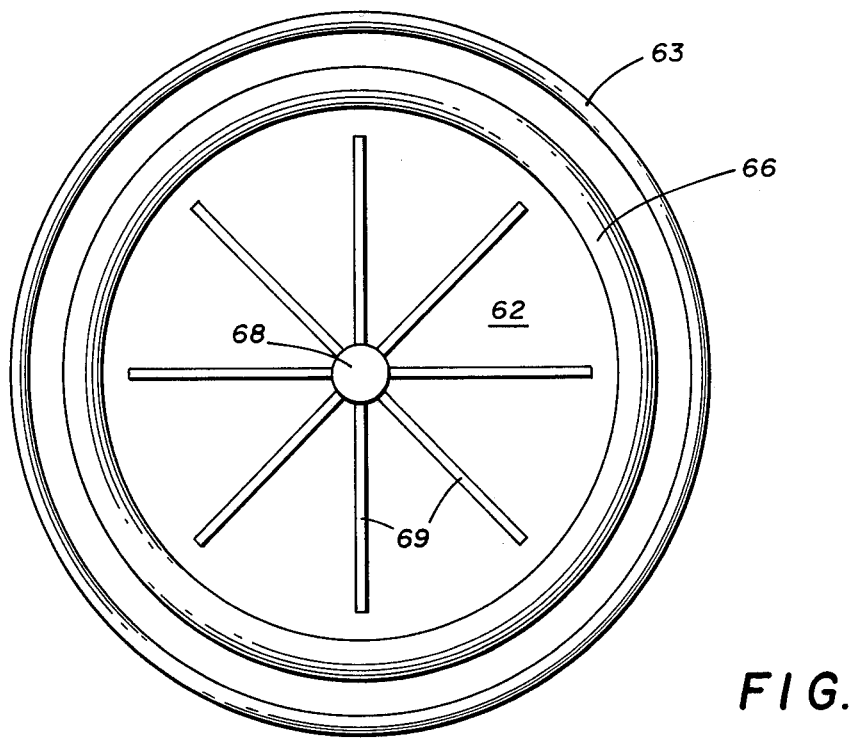
FIG. 6 is a backside view of the diagrams of FIGS. 3 and 4.

The embodiment of FIGS. 4 and 5 is generally similar in construction to that of FIG. 3 but is more suitable for installations in which a limited axial rear spacing "X" is available between the rear case surface and a wall surface 70 for bulging the diaphragm. That is, diaphragm 62 of the FIG. 3 embodiment tends to become hemispherical in shape before sufficient inward radial force is developed to pull or dislodge the diaphragm from its semi-secured clamped position in groove 65. In those situations where the available space "X" is less than that which can accommodate the hemispherical configuration, an alternative diaphragm 72 is employed of substantially similar composition as diaphragm 62 but incorporating a reinforcement fabric 74 of non-stretch, plastic woven composition such as polymer fabric strip about 0.004 inches thick and approximately ⅜ inches wide. Fabric 74 preferably extends molded diametrically within the backside surface of the diaphragm for providing a more controlled stiffness limiting expansion before pullout occurs to a dimension Y. By controlling the stiffness in this manner, temperature compensation to accommodate the expanding fluid is obtained similarly as above yet a dimension "Y" rather than "X" defines the maximum diaphragm excursion at which blowout of the diaphragm will begin for relief of overpressure. The remaining distance X minus Y continues available for pullout to occur.

Figure 7:
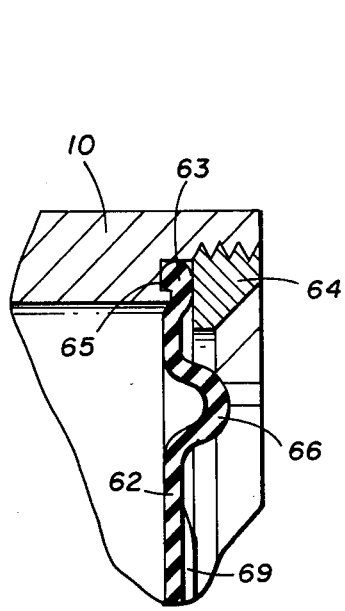
FIG. 7 is a fragmentary sectional view of an alternative case construction adapted for similar purposes as that of FIG. 4.

As shown in FIG. 7, gauge casing 10 is of a right angle configuration rather than the turret configuration of the previous embodiments. Composition of the casing can be either plastic or metal and while unsuitable for wall mounting is otherwise convertible similarly as above.

By the above description there is disclosed a novel casing for a pressure gauge easily field convertible from a dust-tight to a hermetically sealed air-tight or fluid-tight construction at minimal expense and with a minor amount of component substitution. With the mere simplicity of adding an O-ring 60 and substituting a clamped flexible diaphragm 62 of controlled spring rate for the closure plate 46, the conversion is simply and effectively obtained. No vent aperture or fill aperture is required in the manner of the prior art since liquid fill can be easily added with the closure diaphragm removed. By enabling this result to be pursued under field conditions in such a simple manner the previous problem of separate purpose manufacture of those gauges is readily overcome afforing substantially reduced investment in inventory as compared to that previously required.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A gauge instrument comprising in combination:
    (a) a condition responsive element operative to produce a predictable displacement in response to exposed condition changes to which it is sensitive;
    (b) output means operably connected to said condition responsive element for reflecting the displacement position thereof;
    (c) a gauge case substantially containing said condition responsive element and defining an opening for exposing said condition responsive element to the case exterior;
    (d) mounting means extending about said gauge case opening having a mounting structure commonly receptive for one at a time mounting of selectively different closure plates selected from among a first closure plate suitably adapted when supported in said mounting means for effecting a dust-tight sealing relation about said opening and a second closure plate suitably adapted when supported in said mounting means for effecting a pressure relieving liquid-tight sealing relation about said opening; and
    (e) a closure plate of said selective suitability adapted when received in said mounting means to cooperate with the mounting structure of said mounting means for closing said opening.

2. A gauge instrument according to claim 1 in which said one closure plate comprises said second closure plate and said liquid-tight sealing relation effected by said second closure plate also defines a hermetically sealed gas enclosure.

3. A gauge instrument according to claim 1 in which said mounting means includes a screw thread peripherally formed about the wall of said opening.

4. A gauge instrument according to claim 3 in which said first closure plate is adapted to be mounted in an axially secured relation in said mounting means by a screwed connection with the threads of said opening.

5. A gauge instrument according to claim 3 in which said second closure plate comprises a flexible diaphragm of predetermined spring rate correlated to the expansion coefficient of a gauge case fill and there is included an annular ring screwed inward of said threads for axially clamping said diaphragm in its sealing relation relative to said opening.

6. A gauge instrument according to claim 5 in which said condition responsive element comprises a Bourdon tube, said gauge case includes an aperture defined in a sidewall thereof for passing the stem of said Bourdon tube, and there is included means accessible from exterior of said gauge case to support a fluid-tight gasket seal between said stem and said aperture opening for effecting a liquid-tight seal thereat.

7. A gauge instrument according to claim 5 in which the axial clamping relation of said diaphragm by said ring provides a controlled looseness of the diaphragm relative to the gauge case and said looseness enables escape of the diaphragm from its clamping relation in response to a predetermined overpressure occurring within said gauge case.

8. A gauge instrument according to claim 7 in which said gauge case comprises a solid front construction.

9. A gauge instrument according to claim 7 in which said flexible diaphragm includes an internal reinforcement material selectively located therein for relatively reducing the amount of axially rearward deflection of the diaphragm which will be effected before said diaphragm escape can occur.

10. A gauge instrument according to claim 9 in which said reinforcement material comprises an elongated length of fabric composition diametrically positioned in said diaphragm.

11. A gauge instrument comprising in combination:
    (a) a condition responsive element operative to produce a predictable position displacement in response to exposed condition changes to which it is sensitive;
    (b) output means operably connected to said condition responsive element for reflecting the position displacement thereof;
    (c) a gauge case substantially containing said condition responsive element and defining an opening for exposing said condition responsive element to the case exterior;
    (d) screw threads peripherally formed about the wall of said opening;
    (e) a closure plate supported in said opening for closing said opening in a pressure relieving liquid-tight sealing relation therewith and adapting said case for receipt of a liquid fill, said closure plate comprising a flexible diaphragm of predetermined spring rate correlated to the expansion coefficient of a liquid fill received in said gauge case; and
    (f) an annular ring screwed inward of said threads for axially clamping said diaphragm in its sealing relation about said opening.

12. A gauge instrument according to claim 11 in which said condition responsive element comprises a Bourdon tube, said gauge case includes an aperture defined in a sidewall thereof for passing the stem of said Bourdon tube, and there is included means accessible from exterior of said gauge case to support a fluid-tight gasket seal between said stem and said aperture opening for effecting a liquid-tight seal thereat.

13. A gauge instrument according to claim 11 in which the axial clamping relation of said diaphragm by said ring provides a controlled looseness of the diaphragm relative to the gauge case and said looseness enables escape of the diaphragm from its clamping relation in response to a predetermined over-pressure occurring within said gauge case.

14. A gauge instrument according to claim 13 in which said gauge case comprises a solid front construction.

15. A gauge instrument according to claim 13 in which said flexible diaphragm includes an integral reinforcement material selectively located therein for relatively reducing the amount of axially rearward deflection of the diaphragm which will be effected before said diaphragm escape can occur.

16. A gauge instrument according to claim 15 in which said reinforcement material comprises an elongated length of fabric composition diametrically positioned in said diaphragm.

* * * * *